(12) United States Patent
Desrochers

(10) Patent No.: US 10,167,989 B2
(45) Date of Patent: Jan. 1, 2019

(54) MULTIDIRECTIONALLY DEFLECTABLE MOUNTING APPARATUS AND METHOD

(71) Applicant: Bruno J. Desrochers, Ramona, CA (US)

(72) Inventor: Bruno J. Desrochers, Ramona, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 229 days.

(21) Appl. No.: 15/064,392

(22) Filed: Mar. 8, 2016

(65) Prior Publication Data

US 2017/0261149 A1  Sep. 14, 2017

(51) Int. Cl.
*F16M 5/00* (2006.01)
*B60K 8/00* (2006.01)
*F01D 25/28* (2006.01)

(52) U.S. Cl.
CPC .......... *F16M 5/00* (2013.01); *B60K 8/00* (2013.01); *F01D 25/28* (2013.01)

(58) Field of Classification Search
CPC ........ F16M 5/00; F16F 1/3732; F16F 1/3737; F16F 1/3935; Y10T 403/39; Y10T 403/3933; Y10T 403/3981; Y10T 403/453; Y10T 403/54; Y10T 403/31; E02D 27/42; E04H 12/22; E01F 9/627; E01F 9/629; E01F 9/631; E01F 9/638; E04F 17/00; B60K 8/00; F01D 25/28
USPC ........ 285/223, 225, 235; 403/187, 192, 199, 403/223, 291, 50; 404/9; 52/294, 296, 52/297, 302.5, 218, 219, 317, 298; 248/160, 500, 507, 508, 509, 511, 519, 248/521, 523, 534, 605, 606, 607, 622, 248/623, 632, 665, 666
See application file for complete search history.

(56) References Cited

U.S. PATENT DOCUMENTS

| | | | |
|---|---|---|---|
| 1,924,657 A | 8/1933 | Saine et al. | |
| 2,502,322 A * | 3/1950 | Iredell, Jr. ............... | F16F 13/08 267/140.11 |
| 2,555,347 A * | 6/1951 | Lee .......................... | F16F 13/08 267/140.13 |
| 2,571,281 A * | 10/1951 | Neher ...................... | F16F 1/374 267/140.3 |

(Continued)

FOREIGN PATENT DOCUMENTS

| | | | | |
|---|---|---|---|---|
| EP | 2703703 B1 | 8/2015 | | |
| FR | 745785 A * | 5/1933 | .............. | E01F 9/629 |

*Primary Examiner* — Jonathan Liu
*Assistant Examiner* — Guang H Guan
(74) *Attorney, Agent, or Firm* — Tarolli, Sundheim, Covell & Tummino LLP

(57) ABSTRACT

A multidirectionally deflectable engine mounting apparatus includes a laterally oriented base surface and a longitudinally extending elongate shaft having a laterally oriented shaft flange. The shaft flange is longitudinally adjacent to the base surface. A resilient washer is located directly longitudinally between the base surface and the shaft flange. A top plate includes a plate aperture. The shaft extends longitudinally through the plate aperture. The top plate is attached directly to the base surface with the resilient washer and the shaft flange located longitudinally between the base surface and at least a portion of the top plate.

5 Claims, 7 Drawing Sheets

(56) References Cited

U.S. PATENT DOCUMENTS

| | | | | |
|---|---|---|---|---|
| 3,188,041 | A * | 6/1965 | Town | E21D 15/54 |
| | | | | 248/351 |
| 4,209,177 | A | 6/1980 | Hall | |
| 4,252,339 | A * | 2/1981 | Shimizu | B60G 7/00 |
| | | | | 280/124.108 |
| 4,515,499 | A * | 5/1985 | Furiate | E01F 13/02 |
| | | | | 116/63 R |
| 4,923,164 | A * | 5/1990 | Stenberg | E04H 12/2215 |
| | | | | 248/156 |
| 6,141,928 | A * | 11/2000 | Platt | E04F 11/1812 |
| | | | | 256/65.14 |
| 6,354,636 | B2 * | 3/2002 | Matsuzawa | F16L 23/08 |
| | | | | 285/334.5 |
| 7,188,821 | B2 * | 3/2007 | Curtis | E01F 9/681 |
| | | | | 248/206.5 |
| 7,533,506 | B2 * | 5/2009 | Platt | E04H 12/2261 |
| | | | | 52/296 |
| 8,833,033 | B2 * | 9/2014 | Schaefer | E04C 3/06 |
| | | | | 52/710 |
| 9,016,657 | B2 * | 4/2015 | Fang | E02F 9/163 |
| | | | | 248/638 |
| 9,773,400 | B1 * | 9/2017 | Kim | A47B 97/00 |
| 2016/0222609 | A1 * | 8/2016 | Wolters | E01F 9/629 |
| 2016/0312417 | A1 * | 10/2016 | McCue | E01F 9/681 |
| 2017/0261149 | A1 * | 9/2017 | Desrochers | F16M 5/00 |

\* cited by examiner

MULTIDIRECTIONALLY DEFLECTABLE MOUNTING APPARATUS AND METHOD

TECHNICAL FIELD

This disclosure relates to an apparatus and method of an engine mount and, more particularly, to a multidirectionally deflectable engine mounting apparatus and method.

BACKGROUND

A multidirectionally deflectable joint may be useful in many applications that involve axial change in direction. These joints can be used in ducting, mounts, or any other application that would limit the amount of forces in a given direction. For instance, a multidirectionally deflectable can be designed for an axial load, and in other cases, it would limit or eliminate a moment about this axis. These joints can also minimize or eliminate moments due to bending on the attaching structure as would a spherical bearing. However, a spherical bearing is not designed for axial loads, since the shaft or pin would simply slide out of the bearing. In other applications, multidirectionally deflectable joints can transfer torque without taking any bending (e.g., the universal joint of a car's transmission drive shaft). Such a universal joint would not be intended for axial or bending loading; however, it can effectively transfer the power of the engine through torsion to the wheel. In other mechanisms, it may be desirable for a multidirectionally deflectable joint to sustain an axial load while minimizing or eliminating moments ($M_x$, $M_y$, and $M_z$) about the axis.

SUMMARY

In an embodiment, a multidirectionally deflectable engine mounting apparatus is described. The apparatus includes a laterally oriented base surface and a longitudinally extending elongate shaft having a laterally oriented shaft flange. The shaft flange is longitudinally adjacent to the base surface. A resilient washer is located directly longitudinally between the base surface and the shaft flange. A top plate includes a plate aperture. The shaft extends longitudinally through the plate aperture. The top plate is attached directly to the base surface with the resilient washer and shaft flange located longitudinally between the base surface and at least a portion of the top plate.

In an embodiment, a multidirectionally deflectable engine mounting apparatus is described. A base surface is substantially located in a lateral plane. An elongate shaft has longitudinally spaced proximal and distal shaft ends. The shaft has a laterally oriented shaft flange encircling the proximal shaft end. The shaft flange has laterally extending proximal and distal shaft flange surfaces. A resilient washer is located directly between the base surface and the proximal shaft flange surface. A contoured top plate includes a distally raised center portion and a laterally oriented outer plate rim concentric to the center portion. The center portion has a plate aperture surrounding the shaft. The plate rim is connected directly to the base surface. The shaft flange and resilient washer both are located entirely proximal to the center portion and lateral to the plate rim, such that the shaft flange and resilient washer are covered by the top plate and attached to the base surface thereby. The resilient washer compresses under deflection pressure applied laterally to the shaft. Compression of the resilient washer causes a biasing force equal and opposite to the deflection pressure to re-center the shaft when the deflection pressure is removed.

In an embodiment, an engine mount for a vehicle, the vehicle having an engine, is described. The engine mount includes a laterally oriented base surface. A longitudinally extending elongate shaft has a laterally oriented shaft flange. The shaft flange is longitudinally adjacent to the base surface. A resilient washer is located directly longitudinally between the base surface and the shaft flange. A top plate includes a plate aperture. The shaft extends longitudinally through the plate aperture. The top plate is attached directly to the base surface with the resilient washer and shaft flange located longitudinally between the base surface and at least a portion of the top plate.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

Figure 1:
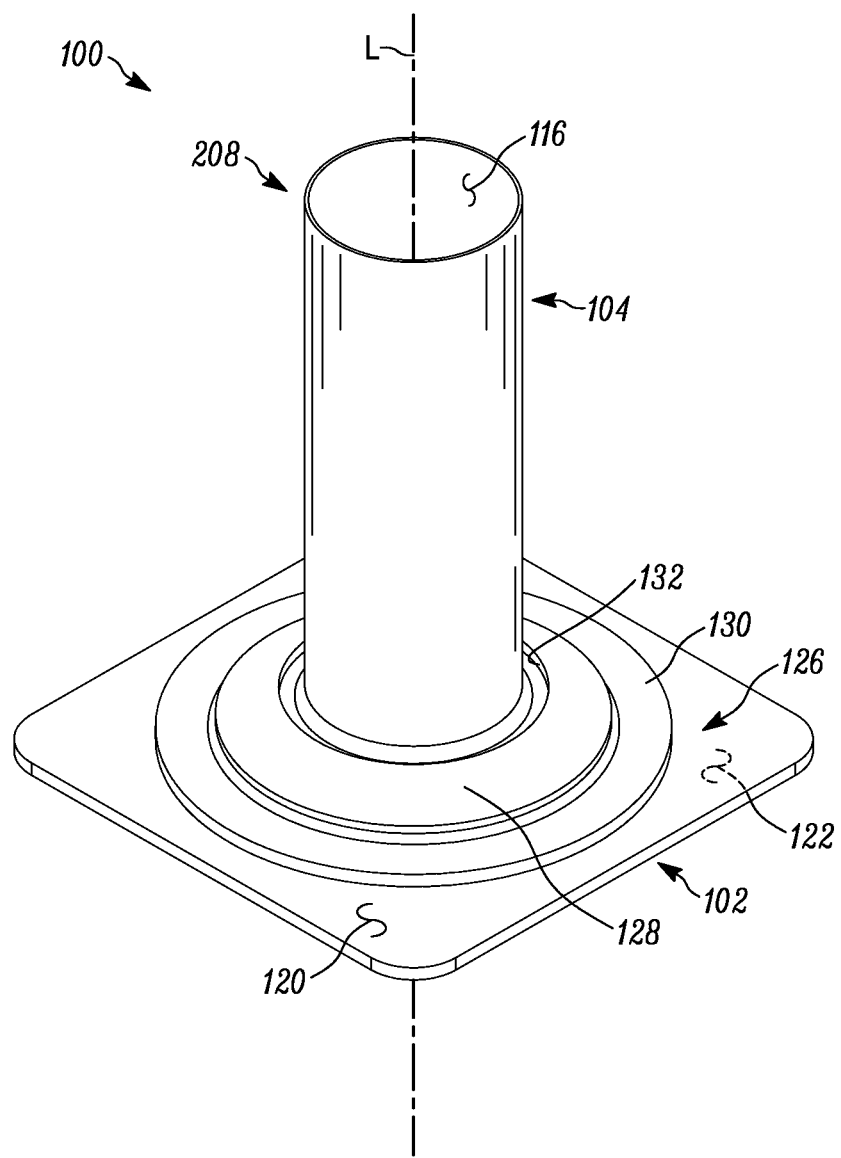
FIG. 1 is a perspective front view of one aspect of the invention.
Figure 2:
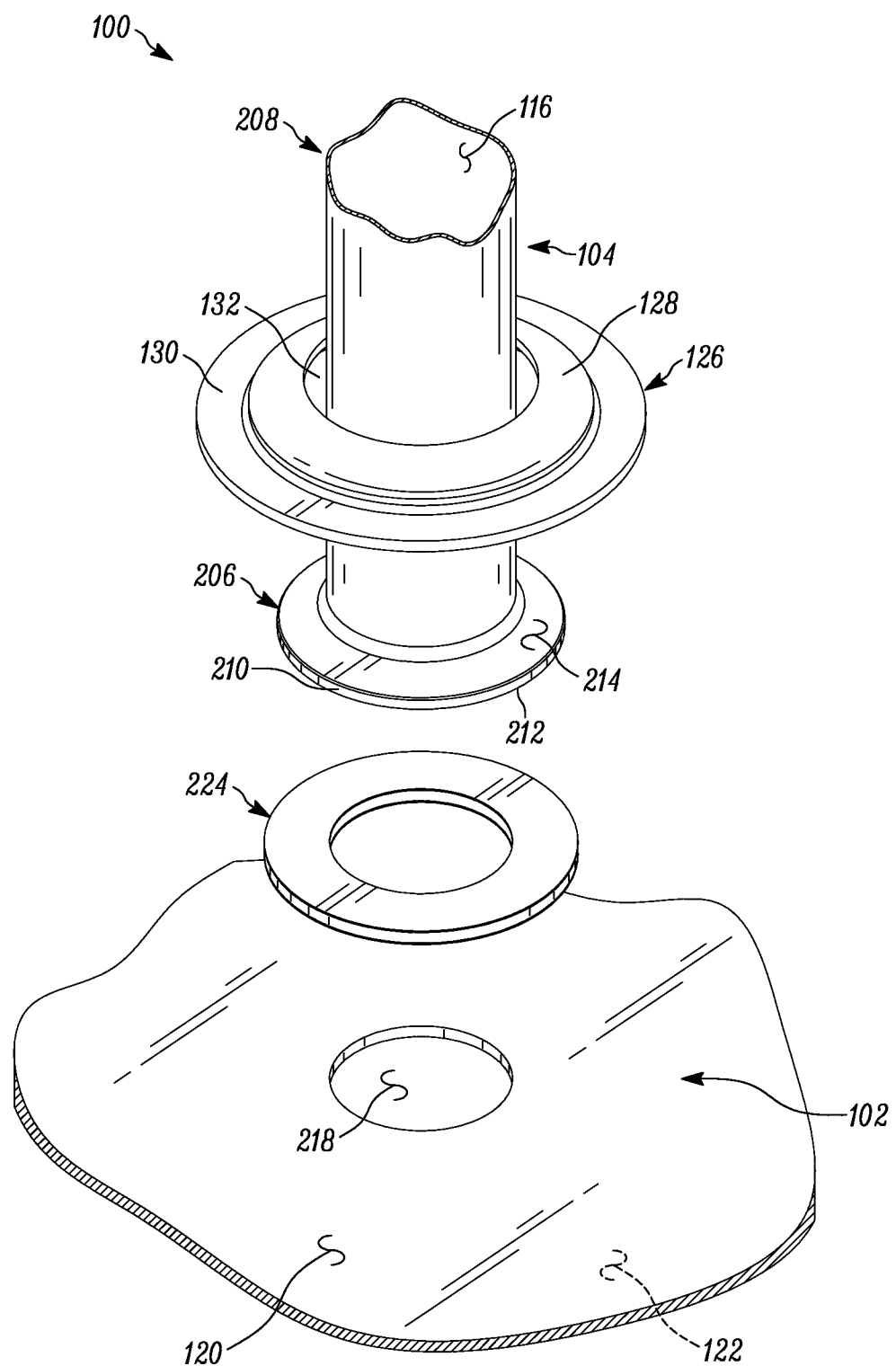
FIG. 2 is an exploded view of the aspect of FIG. 1.
Figure 3:
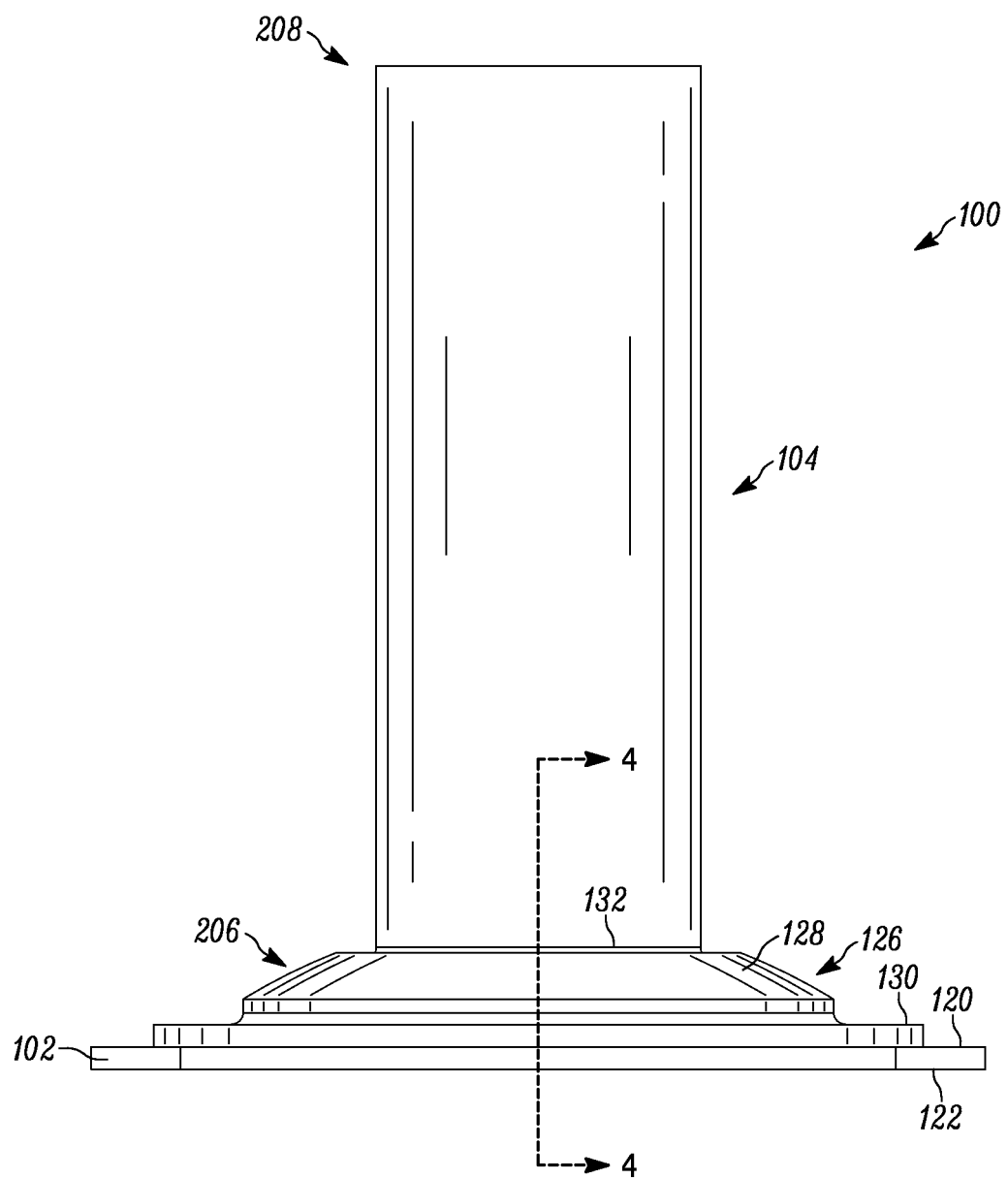
FIG. 3 is a side view of the aspect of FIG. 1.

FIGS. 1-2 depict a multidirectionally deflectable engine mounting apparatus 100, including a laterally oriented base surface 102 and a longitudinally extending elongate shaft 104. The term "engine", as used herein, indicates any machine which turns energy into motive force, such as, but not limited to, internal combustion engines and electric motors. The "longitudinal" direction, as referenced herein, is substantially along and/or parallel to the longitudinal axis L as shown in FIG. 1. The "lateral" direction, as used herein, is a direction that is substantially perpendicular to the longitudinal direction L. At least a portion of the base surface 102 which is used to form the apparatus 100 may be substantially located in a lateral plane. The base surface 102 may comprise a portion of a larger surface (e.g., a bulkhead or wall, such as of an engine compartment) to which the engine is mounted, and/or may itself be attached to another structure for supporting the apparatus 100.

The shaft 104 has longitudinally spaced proximal and distal shaft ends 206 and 208, and a laterally oriented shaft flange 210 encircling the proximal shaft end 206, as shown in FIG. 2. The shaft flange 210 has laterally extending proximal and distal shaft flange surfaces 212 and 214 and is longitudinally adjacent to the base surface 102 when the apparatus 100 is assembled for use. The shaft flange 210 may be tapered in the lateral direction (as shown in the Figures), for example, having a maximum longitudinal thickness at the point where the shaft flange 210 meets the cylindrical body of the shaft 104 (i.e., the innermost portion of the shaft flange 210 with respect to the longitudinal axis L) and a minimum longitudinal thickness at a farthest lateral extent (i.e., the outermost extent from the longitudinal axis L) of the shaft flange 210 from the cylindrical body of the shaft 104.

The shaft 104 could be a solid "rod", or could instead include a longitudinally oriented shaft lumen 116 extending at least partially therethrough. The shaft lumen 116, when present, may place the proximal and distal shaft ends 206 and 208 into fluid communication, and may be substantially coaxial with an aperture 218 in the base surface 102. Optionally, a combination of the shaft lumen 116 and the aperture 218 may provide fluid communication, through the shaft 104, between the ambient space on a "front" side 120 of the base surface 102 (i.e., the surface shown in FIGS. 1-2) and the ambient space on an oppositely facing "rear" side 122 of the base surface 102 (i.e., the surface hidden from view in FIGS. 1-2).

Also in the use configuration, a resilient washer 224 is located directly longitudinally between the base surface 102 and the shaft flange 210 (e.g., a proximal shaft flange surface 212 of the shaft flange 210), as shown in FIG. 2. The resilient washer 224 may be an elastomeric washer, at least partially made from an elastomeric material, such as, but not limited to, plastics and rubber. The resilient washer 224 may also or instead include or be composed of metal (e.g., spring steel)—for example, the resilient washer 224 could be comprised of an elastomeric disk longitudinally "sandwiched" between two metallic disks, which may help to avoid unwanted adhesion of the elastomeric disk to other apparatus 100 structures, as well as facilitate replacement of the resilient washer 224 during maintenance. It is also contemplated that the resilient washer 224 could be entirely metallic, as long as such would provide acceptably resilient properties for operation as described below in particular use environments of the apparatus 100 (including under desired temperature and pressure conditions, for example). As non-limiting examples of configurations, the resilient washer 224 could be a Belleville washer, single or in a stack-up configuration, a wave washer, a spring washer, or any desired type of structure as desired for a particular use environment. Optionally, the resilient washer 224 may be configured to provide a sealing function to the apparatus 100, particularly when the shaft lumen 116 and aperture 218 are in fluid communication. In any event, one of ordinary skill in the art will be able to specify suitable materials for the various portions of the apparatus 100 for a particular use environment, though it is contemplated that the resilient washer 224 will be a less-rigid structure (via choice of material and/or design) than the structures against which it presses and bears during operation of the device.

A contoured top plate 126 may include a distally raised center portion 128 and a laterally oriented outer plate rim 130 concentric to the center portion 128. The center portion 128 has a plate aperture 132 surrounding the shaft 104 such that the shaft 104 extends longitudinally through the plate aperture 132. The plate rim 130 is connected, in operation of the apparatus 100, directly to the base surface 102. The shaft flange 210 and resilient washer 224 are both located entirely proximal to the center portion 128 and lateral to (that is, laterally toward the longitudinal axis L from) the plate rim 130. The shaft flange 210 and resilient washer 224 are both covered by the top plate 126 and are attached to the base surface 102 by the top plate 126, by being "sandwiched" between the top plate 126 and the base surface 102. For example, the top plate 126 may be attached directly to the base surface 102—such as, but not limited to, a welded, brazed, bonded, adhesive, bolted, or other type of mechanical connection—with the resilient washer 224 and shaft flange 210 located longitudinally between the base surface 102 and at least a portion of the top plate 126. For example, the apparatus 100 could include a clamp-up joint where fingers (over-center locking tab) are attached to base surface 102 and secure the plate rim 130 in place.

Figure 4A:
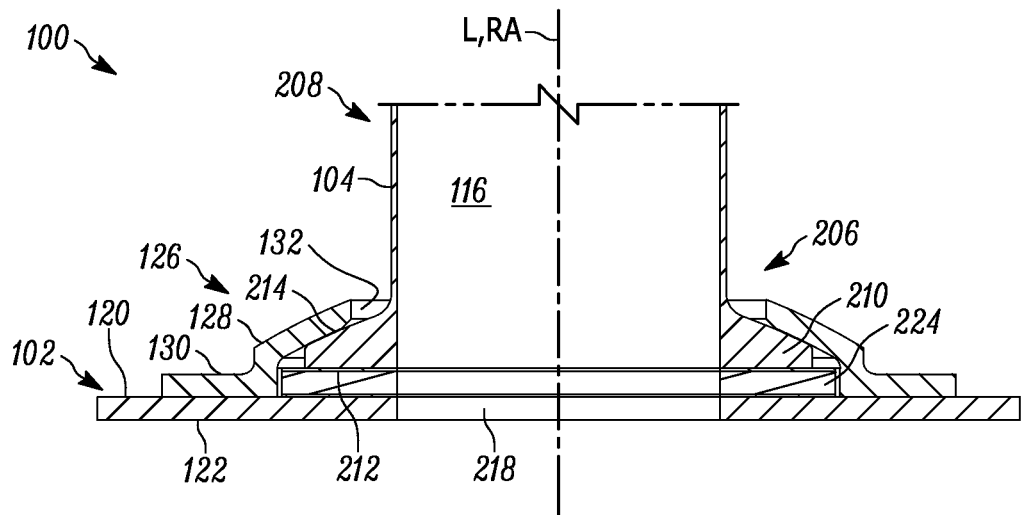
FIGS. 4A and 4B are partial cross-sectional views taken along line 4-4 of FIG. 3, showing a sequence of use.
Figure 4B:
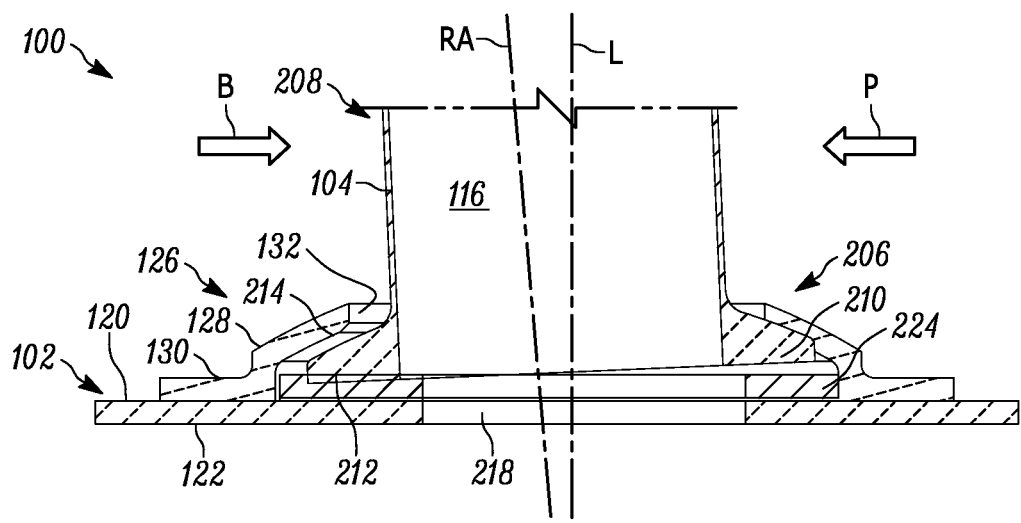

As shown in the sequence of FIGS. 4A-4B, the apparatus 100 is configured to allow the shaft 104 to precess about the longitudinal axis L with respect to the base surface 102, as represented by motion of the depicted rotation axis RA. While the depicted arrangement is intended to allow a small degree of precession or deflection (in the range of 0° to 5°, and more specifically 0.5° to 2°, of the rotation axis RA from the resting position), one of ordinary skill in the art will be able to configure the various structures of the apparatus 100 to allow any desired amount of deflection or precession for a particular use application of the apparatus 100.

In the sequence depicted in FIGS. 4A-4B, the apparatus 100 begins at a "resting" position in FIG. 4A, where the rotation axis RA of the shaft 104 is substantially coincident with the longitudinal axis L of the apparatus as a whole. Turning to FIG. 4B, then, a deflection pressure P has been applied substantially laterally to the shaft 104. At least a portion of the resilient washer 224 (here, the portion toward the top of the page in the orientation of FIGS. 4A-4B) compresses under the deflection pressure P as transmitted through the shaft flange 210, thus permitting precession or deflection of the rotation axis RA of the shaft 104 out of correspondence with the longitudinal axis L. Through compression of a selected portion of the resilient washer 224, the apparatus 100 permits the shaft 104 to depart from the initial, substantially perpendicular, orientation with respect to the base surface 102 without disengaging or dismounting the shaft 104 from the base surface 102.

As can be seen via the visual depiction of the resilient washer 224 in FIGS. 4A-4B, the shaft flange 210 may pull away from a portion of the resilient washer 224 which is located nearest to the radial location at which deflection pressure P is exerted upon the shaft 104. Here, this "least pressure" area of the deflection pressure P upon the resilient washer 224 is located toward the bottom of the page in the orientation of FIGS. 4A-4B. While a slight gap is shown, for ease of description, in FIG. 4B to show how the shaft 104 and shaft flange 210 "tilt" under the deflection pressure, it is also contemplated that the shaft flange 210 will remain in contact with the resilient washer 224 at this "least pressure" area, but with a reduction of contact force between the shaft flange 210 and the resilient washer 224.

When present, the tapered aspect of the shaft flange 210 (as shown in FIGS. 4A-4B) may assist with guiding the variable compression of the resilient washer 224, such as by facilitating interaction with an underneath (proximal-facing) surface of the top plate 126. For example, the radius of the shaft flange 210 could be predetermined in accordance with a desired rotation point of the apparatus 100. The material(s) of the top plate 126, shaft flange 210, and base surface 102 may also or instead be chosen to achieve a desired compression response from the resilient washer 224. For example, the top plate 126, shaft flange 210, and base surface 102 could be made from metal, thermo-plastics, fiberglass, carbon epoxy. or from any other suitable material or combination of materials for a particular use application of the apparatus 100. Any desired component of the apparatus 100 could be made of any suitable material, and in any desired manner, such as, but not limited to, molding, layups, machining, or in any other way.

Compression of the resilient washer 224, such as shown in FIG. 4B, under the deflection pressure P will cause a biasing force B to be developed in the resilient washer 224, due to the interaction between the proximal shaft flange surface 212 and the resilient material of the resilient washer 224. For many use applications of the apparatus 100, the material selection and physical configuration of the resilient washer 224 and the shaft flange 210 will cause the biasing force B to be equal and opposite to the deflection pressure P such that the biasing force B acts to re-center the shaft 104 (i.e., return the rotation axis RA to substantial collinearity with the longitudinal axis L) when the deflection pressure P is removed. In this manner, the apparatus 100 can provide a "self-centering" function which may be desirable in some use applications.

Figure 5:
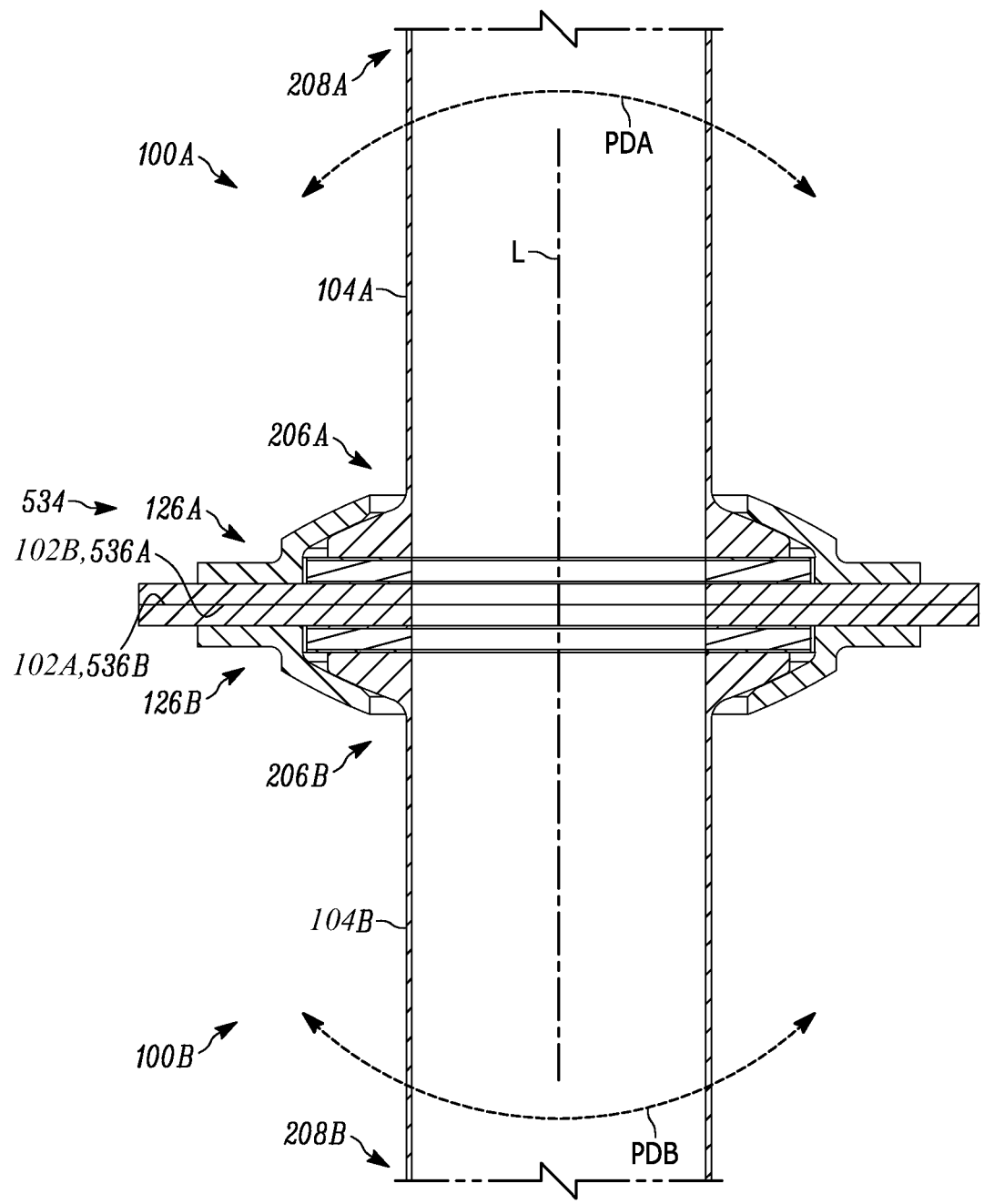
FIG. 5 is a partial cross-sectional view of a system including the aspect of FIG. 1.

FIG. 5 depicts a mounting system 534 including the multidirectionally deflectable engine mounting apparatus 100 described above as a first multidirectionally deflectable engine mounting apparatus 100A, and further including a second multidirectionally deflectable engine mounting apparatus 100B oriented in mirrored longitudinal opposition to the first multidirectionally deflectable engine mounting apparatus 100A. As shown in FIG. 5, a mounting system 534 including such a linearly mirrored multidirectionally deflectable engine mounting apparatus arrangement would have an undersurface 536A or 536B of the top plate 126A or 126B of one of the first and second multidirectionally deflectable engine mounting apparatuses 100A and 100B serving as the base surface 102A or 102B for the other one of the multidirectionally deflectable engine mounting apparatus 100A and 100B—and vice versa. The mounting system 534 of FIG. 5 could be used in, for example, a ducting or other use environment where a slight change in direction or re-alignment due to an offset of the centerline (L) is present in the installation. In this case, a marmon clamp could be used to hold the first and second multidirectionally deflectable engine mounting apparatuses 100A and 100B together.

That is, unless a separate "mutual base surface" (not shown) is provided to longitudinally separate the first and second multidirectionally deflectable engine mounting apparatuses 100A and 100B, then the top plates 126A, 126B will mutually act as base surfaces 102A, 102B for each other. In the FIG. 5 arrangement of the mounting system 534, the first and second proximal ("inboard") shaft ends 206A and 206B of the first and second multidirectionally deflectable engine mounting apparatuses 100A and 100B are located directly adjacent one another and are longitudinally interposed between the first and second distal ("outboard") shaft ends 208A and 208B of the first and second multidirectionally deflectable engine mounting apparatuses 100A and 100B.

The mounting system 534 of FIG. 5 can therefore be used in a "universal joint" manner, such as to allow some degree of mutual bending or flexing (represented by precession direction arrows PDA and PDB in FIG. 5) along the length of a shaft, which may itself be rotating around the mutual longitudinal axis L. It is also contemplated that the shafts 104A and 104B of the first and second multidirectionally deflectable engine mounting apparatuses 100A and 100B may be different portions of a single elongated shaft structure, having at least one shaft flange 210 spaced from both ends (corresponding to the first and second distal ["outboard"] shaft ends 208A and 208B), and that the precession of the single shaft (simultaneously comprising 104A and 104B) would occur in opposition about both sides of the flange and permit "waggling" of the single shaft about the washer/top plate assembly shown in the center of FIG. 5.

Figure 6:
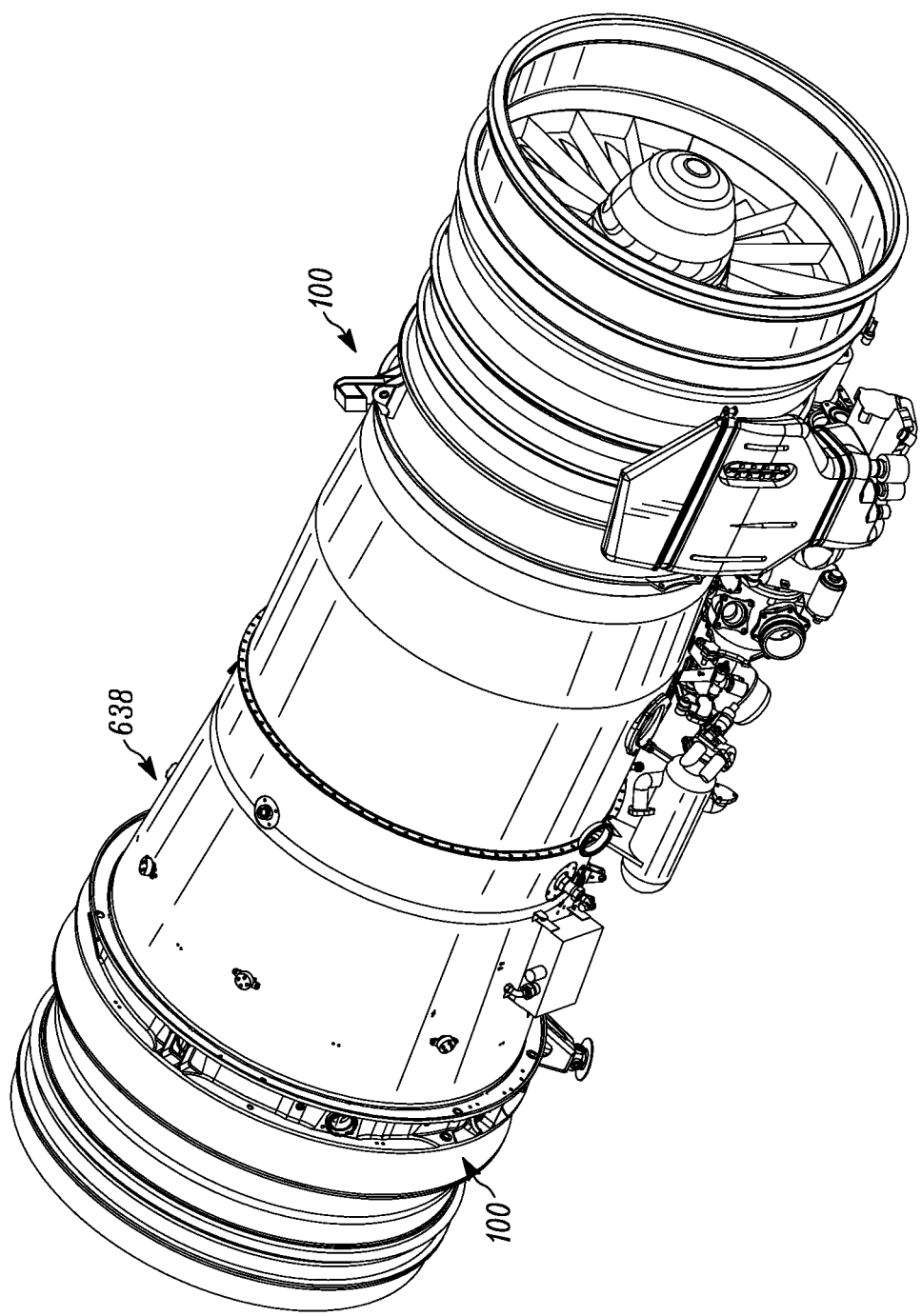
FIG. 6 is a schematic view of the aspect of FIG. 1 in an example use environment.
Figure 7:
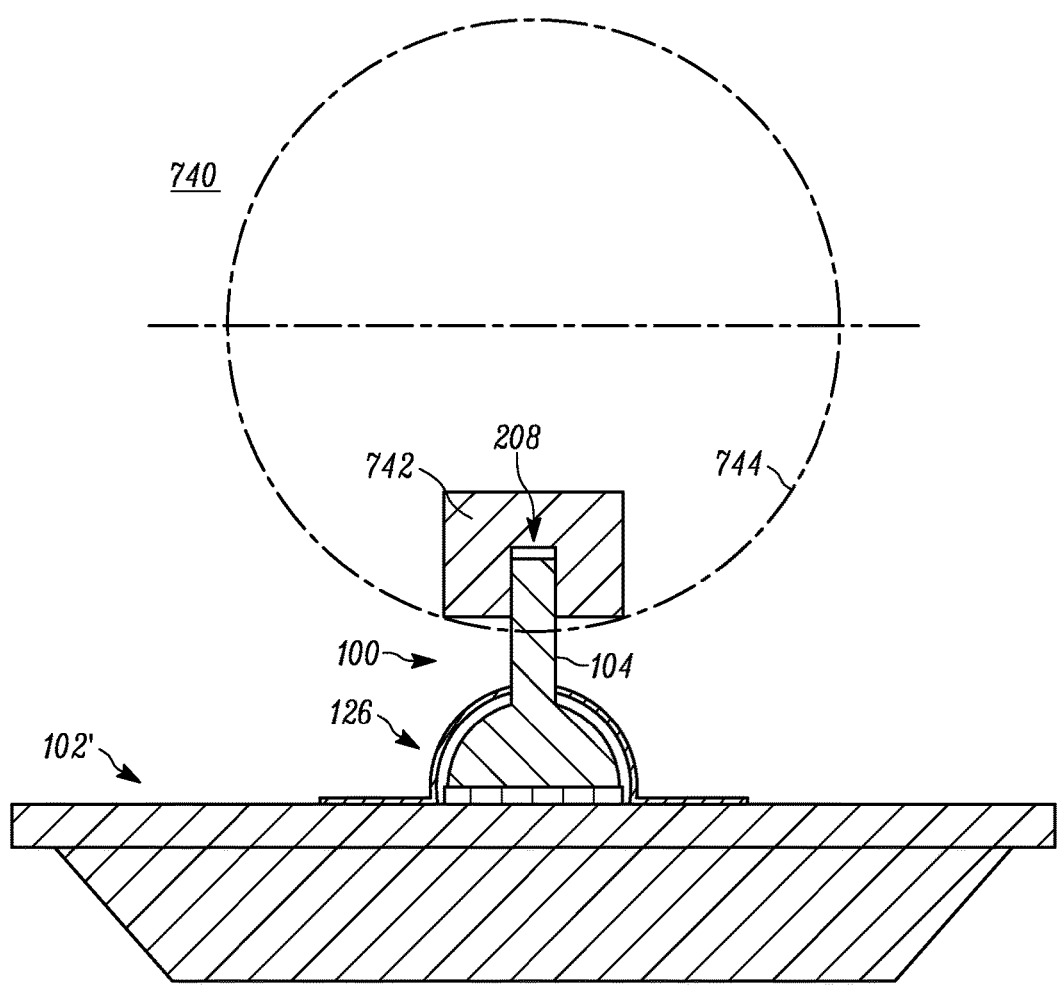
FIG. 7 is a partial schematic view of the aspect of FIG. 1 in the example use environment of FIG. 6.

FIGS. 6-7 depict the apparatus 100 of FIGS. 1-5 in an example engine mounting use environment. An engine 638 is attached, via one or more apparatuses 100, to a wall (102', as shown in FIG. 7) of an engine compartment 740. The wall 102' acts as a base surface, as described above. There may be any desired number of apparatuses 100 used to mount the engine 638 to any desired surface(s) of the engine compartment 740. Optionally, as shown in FIG. 7, at least one anchor 742 may be used (e.g., located inside an outer shell 744 of the engine 638) to hold the distal shaft end 208 to the engine 638 in a supporting manner.

It is contemplated that the resilient washer 224 and/or other components of the apparatus 100 may be configured (e.g., through inclusion of rotating bearing features) to permit rotation of the shaft 104 relative to the base surface 102 in a rotation direction centered around the longitudinal axis L. It is also contemplated that, while the precession or deflection described above for the shaft 104 relative to the base surface 102 will mainly be in a lateral (e.g., "X-Y") plane, it is also contemplated that the various structures of the apparatus 100 could permit motion of the shaft 104 in the Z-direction—that is, along the longitudinal axis L, toward and/or away from the base surface 102. Optionally, the apparatus 100 could include one or more features (e.g., a second resilient washer [not shown] located longitudinally between the shaft flange 210 and the center portion 128 of the top plate 126) to facilitate such Z-direction motion of the shaft 104 relative to the base surface 102.

Since the resilient washer 224 can break down over time under the forces exerted by repeated deflection pressure P events/cycles, it is contemplated that the apparatus 100, or parts thereof (e.g., the base surface 102 and the top plate 126) may be configured for relatively simple disassembly to allow replacement of the resilient washer 224 as a routine maintenance event. It is also contemplated that various resilient washer 224 configurations, having different resilience properties, could be provided to "tune" the deflection/precession/recentering characteristics and responses of the shaft 104 relative to the base surface 102.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. The apparatus 100 is shown and described herein as being used in an engine mount, such as for any vehicle having an engine (e.g., a land vehicle such as a truck, car, tank, or the like; and/or an air vehicle such as an airplane, helicopter, blimp, or the like), but can be used in any desired use environment for mounting of a longitudinal shaft 104 to a laterally-oriented base surface 102. A "predetermined" status may be determined at any time before the structures being manipulated actually reach that status, the "predetermination" being made as late as immediately before the structure achieves the predetermined status. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

What is claimed is:

1. A mounting system, comprising:
   a first multidirectionally deflectable engine mounting apparatus; and
   a second multidirectionally deflectable engine mounting apparatus;
   wherein each of the first and second multidirectionally deflectable engine mounting apparatuses includes
      a base having a base surface and an undersurface, the base surface substantially located in a lateral plane,
      an elongate shaft having a proximal shaft end and a distal shaft end, the proximal and distal shaft ends being longitudinally spaced from one another, the shaft having a laterally oriented shaft flange encircling the proximal shaft end, the shaft flange having a proximal shaft flange surface and a distal shaft flange surface, the proximal and distal shaft flange surfaces each being laterally extending,
      a resilient washer located directly between the base surface and the proximal shaft flange surface, and
      a contoured top plate including a distally raised center portion and a laterally oriented outer plate rim concentric to the center portion, the center portion having a plate aperture surrounding the shaft, the plate rim being connected directly to the base surface, and the shaft flange and the resilient washer both being located entirely proximal to the center portion and lateral to the plate rim, such that the shaft flange and the resilient washer are covered by the top plate and attached to the base surface thereby,
      wherein the resilient washer is configured to be compressed under deflection pressure applied laterally to the shaft, compression of the resilient washer being configured to cause a biasing force equal and opposite to the deflection pressure to re-center the shaft when the deflection pressure is removed;
   wherein the second multidirectionally deflectable engine mounting apparatus is oriented in mirrored longitudinal opposition to the first multidirectionally deflectable engine mounting apparatus such that the undersurface of the base of the first multidirectionally deflectable engine mounting apparatus is in direct contact with the undersurface of the base of the second multidirectionally deflectable engine mounting apparatus, and the proximal shaft ends of the first and second multidirectionally deflectable engine mounting apparatuses are located adjacent one another, with both the proximal shaft ends of the first and second multidirectionally deflectable engine mounting apparatuses being concurrently longitudinally interposed between the distal shaft ends of the first and second multidirectionally deflectable engine mounting apparatuses.

2. The mounting system of claim 1, wherein the resilient washer of the first multidirectionally deflectable engine mounting apparatus is an elastomeric washer.

3. The mounting system of claim 1, wherein the shaft of the first multidirectionally deflectable engine mounting apparatus defines a longitudinally oriented shaft lumen placing the proximal and distal shaft ends of the first multidirectionally deflectable engine mounting apparatus into fluid communication.

4. The mounting system of claim 3, wherein the shaft lumen of the first multidirectionally deflectable engine mounting apparatus is substantially coaxial with an aperture in the base of the first multidirectionally deflectable engine mounting apparatus.

5. The mounting system of claim 1, wherein the shaft flange of the first multidirectionally deflectable engine mounting apparatus is tapered in a lateral direction, having a maximum longitudinal thickness at the shaft of the first multidirectionally deflectable engine mounting apparatus and a minimum longitudinal thickness at a farthest lateral extent from the shaft of the first multidirectionally deflectable engine mounting apparatus.

* * * * *